Nov. 22, 1938.  H. J. HORN  2,137,288
VEHICLE WHEEL
Filed June 24, 1935  2 Sheets-Sheet 1

INVENTOR.
HARRY J. HORN
BY Carroll R. Taber
ATTORNEY.

Patented Nov. 22, 1938

2,137,288

UNITED STATES PATENT OFFICE 2,137,288

VEHICLE WHEEL

Harry J. Horn, Lansing, Mich., assignor to Motor Wheel Corporation, Lansing, Mich., a corporation of Michigan Application June 24, 1935, Serial No. 28,065

3 Claims. (Cl. 301—62)

This invention relates to vehicle wheels and particularly to metallic wheels for motor vehicles, having as a general object the provision of a strong, sturdy and artistic wheel of this character, the parts of which are simple in construction and formed in such a manner as to lend themselves to quick and easy assembly. Other objects and advantages will become apparent from a reading of the following description taken in connection with the accompanying drawings, wherein.

Figure 1:
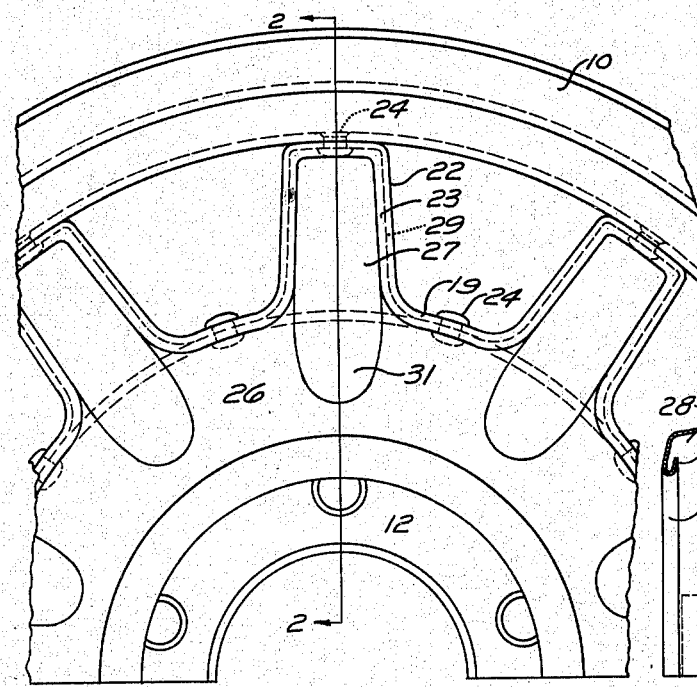
Figure 1 is a fragmentary elevational view of a vehicle wheel constructed in accordance with the present invention.
Figure 2:
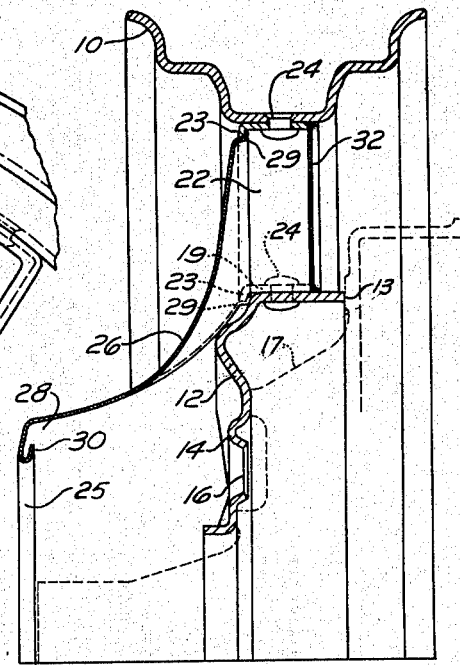
Figure 2 is a vertical sectional view taken substantially on the line 2—2 of Figure 1.

Referring now to the drawings, and particularly to Figures 1 and 2, thereof, a vehicle wheel is shown comprising a drop center metal tire rim 10 of conventional construction and a hub member or bolting-on flange 12, also of conventional construction. The hub member is provided with a laterally extending flange 13 and a bolting-on portion 14 having a plurality of holes 16 formed therein to receive studs (not shown) for securing the bolting-on flange to a hub proper 17, shown by dotted lines in Figure 2.

Figures 7, 8, 9:
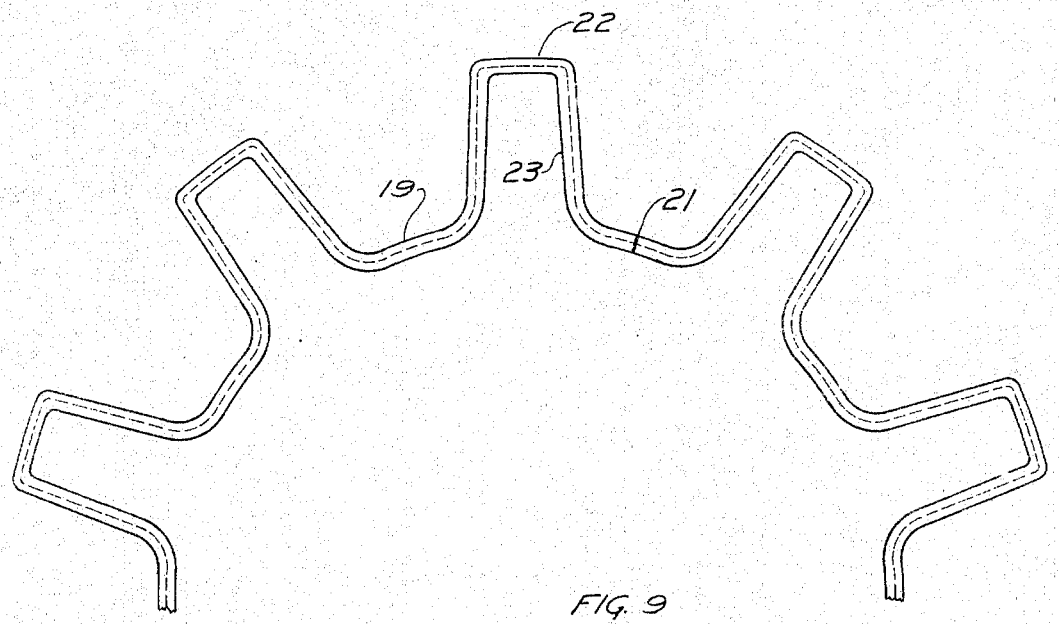
Figure 7 is a plan view of the metal strip used in forming the spoke spider.
Figures 8 and 9 illustrate the various steps taken in completing the spoke spider.

As previously pointed out, it is an important object of the invention to provide a strong, sturdy spoke spider which is economical to manufacture. To this end, a single strip of metal 11 (Fig. 7) may be simply bent by die-forming or by any other suitable method to provide a base portion 15 and a plurality of equi-distantly spaced projecting portions 20 of equal width and height (Fig. 8). It may be here emphasized that the strip or ribbon of metal 11 is shaped to provide the projecting portions 20 by a simple bending operation as distinguished from a drawing or other operation where the original metal strip is appreciably stretched or extended.

The strip of metal thus formed may then be flanged along one edge thereof as at 23 and coiled by any suitable method into circular form (Fig. 9). The ends of the coiled strip are welded as at 21 or otherwise suitably secured together providing a spoke spider as shown having a hub portion 19 and a plurality of radially extending skeleton spokes 22 each of which is open at its front and rear sides. The spoke spider thus formed may then be suitably secured between the lateral flange 13 of the bolting-on flange 12 and the drop center portion of the rim 10 by rivets 24 as shown or by any other suitable means.

A spoke spider formed in the above manner has exceptional torsional and lateral stability due to its one-piece construction and is obviously cheap to manufacture. The depth of the spoke sections may be varied to provide the desired lateral stiffness to the wheel and the relative angle of the base or hub portion 19 and spoke sides may also be varied to provide the desired torsional stability.

To provide additional torsional and lateral stiffness to the wheel, a suitable attractively formed front cover plate 26 may be attached thereto. The cover plate includes a center opening 25, spoke portions 27 of the same peripheral contour as the spokes of the spoke spider and having ribbed portions 31, an axially extending center portion 28 having the inner edge thereof turned back upon itself as at 30 to receive a hub cap (not shown), and a flanged portion 29 along the outer peripheral edge thereof to co-operate with the flanged portion 23 of the spoke spider. In assembling the wheel, the cover is secured directly to the spoke spider by the interlocking flanges 23 and 29. It will be noted from Figure 2 that the portion of the flange 29 between the spoke sections is locked between the flange 23 and the edge of the bolting-on flange 12.

If desirable, a suitably shaped back cover plate 32 may be welded or otherwise secured to the inner periphery of the rim 10 in abutting relation to the inside edge of the spoke spider. Although this back cover plate is not essential, it adds to the stability of the wheel by completing the spoke sections into substantially square, enclosed units.

Figure 3:
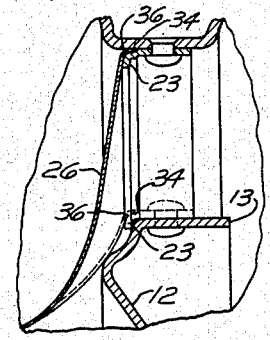
Figures 3 and 4 are fragmentary vertical sectional views of modified forms of the invention.

In the modified form of the invention shown in Figure 3, the spoke spider is formed with a peripheral depression 34 adjacent the outer edge thereof to receive a laterally extending flange 36 formed on the cover plate. The flanged edge 36 is secured between the spoke spider and the drop center portion of the rim 10, thus completely concealing the spoke spider.

Figure 4:
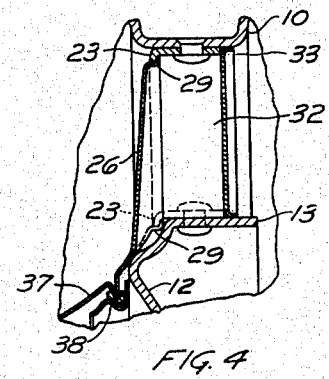

As shown in Figure 4, the cover plate has no axially extending portion such as the portion 28 shown in Figure 2 but a hub cap 37 is secured thereto adjacent the bolting-on flange 12 by any suitable means such as a resilient channel 38 formed on or secured to the inner peripheral edge of the cover plate.

Figure 5:
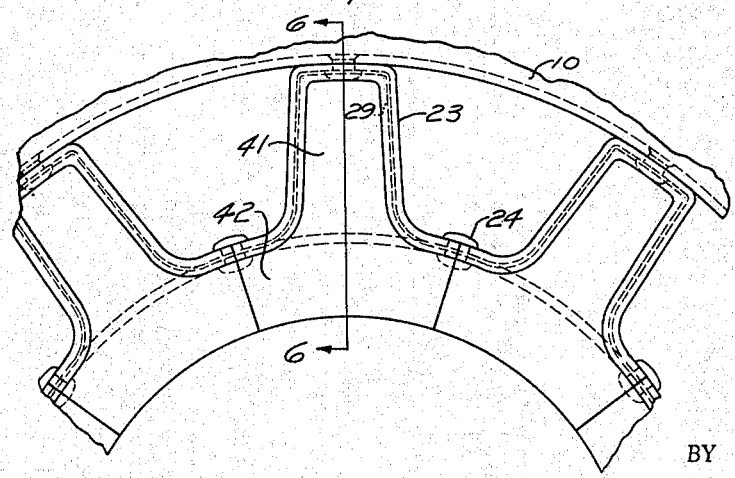
Figure 5 is a fragmentary elevational view of still another form the invention may take.

As a manufacturing expedient, it may be desirable to form the cover plate from a plurality of sections. This may be accomplished as shown in Figure 5 by the provision of a plurality of spoke-like portions 41 having matching, segmental bases 42 which, when assembled as shown, form a complete cover plate similar to the cover plate 26 as shown in Figures 1 and 2. The individual sections are formed with flanged portions to engage the spoke spider flanges 23 in the same manner as shown in Figures 1 and 2 and are in other respects substantially identical.

Figure 6:
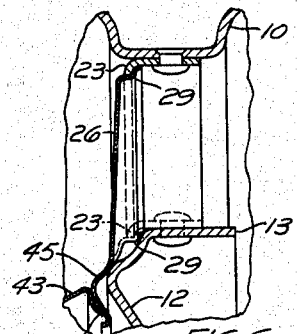
Figure 6 is a fragmentary vertical sectional view taken substantially on the line 6—6 of Figure 5.

As shown in Figure 6, the hub cap 43 may be provided with a resilient peripheral flange 44 to directly engage beaded portions 45 on the inner peripheries of the individual cover sections shown in Figure 5.

Various modifications in construction, design and the method of manufacture as herein specifically described will readily suggest themselves to those skilled in the art, but it is to be understood that the invention is to be limited only by the appended claims.

I claim:

1. A vehicle wheel including, in combination, a disk-like bolting on member having a peripheral flange of substantially axial extent, a rim arranged in concentric relation to said peripheral flange, a spoke spider comprising a strip of metal, the main body portion of which extends transversely of the wheel plane, alternately attached to the rim and said peripheral flange, and a cover for the spoke spider comprising a single stamping having a serpentine peripheral formation provided with a continuous peripheral flange juxtaposed to the main body portion of the spoke spider, said cover being secured to the spoke spider adjacent the periphery thereof.

2. A vehicle wheel including, in combination, a disk-like bolting on member having a peripheral flange of substantial axial extent, a rim arranged in concentric relation to said peripheral flange, a spoke spider comprising a strip of metal, the main body portion of which extends transversely of the wheel plane, alternately attached to the rim and said peripheral flange, said spoke spider having an angularly extending continuous flange at one edge thereof, and a cover for the spoke spider comprising a single stamping having a serpentine peripheral formation provided with a continuous peripheral flange juxtaposed to the main body portion of the spoke spider, said cover being secured to the spoke spider adjacent the periphery thereof.

3. A vehicle wheel including, in combination, a disk-like bolting on member having a peripheral flange of substantial axial extent, a rim arranged in concentric relation to said peripheral flange, a spoke spider comprising a strip of metal, the main body portion of which extends transversely of the wheel plane, alternately attached to the rim and said peripheral flange, said spoke spider having a continuous angular flange at one edge thereof, and a cover for the spoke spider comprising a single stamping having a serpentine peripheral formation provided with a continuous peripheral flange, the outer face of the cover and its peripheral flange cooperating with the angular flange at the edge of the spoke spider and the main body of said spoke spider respectively to stiffen the spoke spider and secure the cover thereto.

HARRY J. HORN.